US007171372B2

United States Patent
Daniel et al.

(10) Patent No.: US 7,171,372 B2
(45) Date of Patent: Jan. 30, 2007

(54) COMPUTERIZED METHOD AND SYSTEM FOR GUIDING SERVICE PERSONNEL TO SELECT A PREFERRED WORK SITE FOR SERVICING TRANSPORTATION EQUIPMENT

(75) Inventors: Cecil M. Daniel, Erie, PA (US); Daniel Agramonte, Marietta, GA (US)

(73) Assignee: General Electric Company, Schenectady, NY (US)

( * ) Notice: Subject to any disclaimer, the term of this patent is extended or adjusted under 35 U.S.C. 154(b) by 1108 days.

(21) Appl. No.: 09/923,825

(22) Filed: Aug. 7, 2001

(65) Prior Publication Data

US 2002/0022984 A1 Feb. 21, 2002

Related U.S. Application Data

(60) Provisional application No. 60/223,148, filed on Aug. 7, 2000.

(51) Int. Cl.
*G06Q 10/00* (2006.01)
(52) U.S. Cl. .............................................. 705/7; 705/9
(58) Field of Classification Search .................... 705/7, 705/9
See application file for complete search history.

(56) References Cited

U.S. PATENT DOCUMENTS

| 4,404,639 | A | | 9/1983 | McGuire et al. |
| 4,697,243 | A | | 9/1987 | Moore et al. |
| 5,111,391 | A | | 5/1992 | Fields et al. |
| 5,122,976 | A | * | 6/1992 | Bellows et al. ............. 702/185 |
| 5,623,404 | A | | 4/1997 | Collins et al. |
| 5,717,595 | A | | 2/1998 | Cherrington et al. |
| 5,778,381 | A | | 7/1998 | Sandifer |
| 5,786,998 | A | | 7/1998 | Neeson et al. |
| 5,812,758 | A | * | 9/1998 | Laureanno ................... 714/46 |
| 5,867,801 | A | | 2/1999 | Denny |
| 5,902,985 | A | | 5/1999 | Bos et al. |
| 5,913,914 | A | | 6/1999 | Kemner et al. |
| 5,920,846 | A | * | 7/1999 | Storch et al. .................. 705/7 |
| 5,922,040 | A | | 7/1999 | Prabhakaran |

(Continued)

FOREIGN PATENT DOCUMENTS

AU 2001255572 A1 * 11/2002

(Continued)

OTHER PUBLICATIONS

Birkland, Carol, "Using (electronic) magic wands", Aug. 1996, Fleet Equipment; 22, 8; ABI/INFORM Global, p.30.*

(Continued)

*Primary Examiner*—Susanna M. Diaz
*Assistant Examiner*—Jonathan G Sterrett
(74) *Attorney, Agent, or Firm*—Enrique J. Mora; Beusse, Wolter, Sanks, Mora & Maire, P.A.

(57) ABSTRACT

Computerized method and system for guiding personnel servicing equipment requiring repair while at an equipment work site are provided. The personnel is guided through a plurality of tasks for evaluating the health of the equipment to identify the nature and extent of service needed, and determining at least one preferred work site location for performing the services based on technical and business decision-making criteria.

16 Claims, 11 Drawing Sheets

U.S. PATENT DOCUMENTS

| | | | |
|---|---|---|---|
| 5,931,877 | A | 8/1999 | Smith et al. |
| 5,961,560 | A | 10/1999 | Kemner |
| 5,978,717 | A | 11/1999 | Ebersohn et al. |
| 6,052,631 | A | 4/2000 | Busch et al. |
| 6,067,486 | A | 5/2000 | Aragones et al. |
| 6,070,155 | A | 5/2000 | Cherrington et al. |
| 6,115,691 | A | 9/2000 | Ulwick |
| 6,167,333 | A | 12/2000 | Gehlot |
| 6,170,742 | B1 | 1/2001 | Yacoob |
| 6,182,048 | B1 | 1/2001 | Osborn et al. |
| 6,216,108 | B1 | 4/2001 | LeVander |
| 6,219,597 | B1 | 4/2001 | Longere |
| 6,240,365 | B1 | 5/2001 | Bunn |
| 6,260,048 | B1 | 7/2001 | Carpenter et al. |
| 6,263,265 | B1 | 7/2001 | Fera |
| 6,263,266 | B1 | 7/2001 | Hawthorne |
| 6,263,322 | B1 | 7/2001 | Kirkevoid et al. |
| 6,298,308 | B1 * | 10/2001 | Reid et al. ............... 702/56 |
| 6,397,131 | B1 * | 5/2002 | Busch et al. ............. 701/29 |
| 6,879,962 | B1 * | 4/2005 | Smith et al. ............. 705/22 |

FOREIGN PATENT DOCUMENTS

JP        2002258937 A    *    9/2002

OTHER PUBLICATIONS

Pintelon, Liliane; Du Preez, Niek; Van Puyvelde, Frank; "Information Technology: Opportunities for Maintenance Management", 1999, Journal of Quality in Maintenance Management, Bradford, vol. 5, Iss. 1; p. 9 ProQuest ID 86926406.*

Bylinsky, Gene, "Fixing Machines from Afar", Aug. 17, 1998, Fortune, vol. 138, Iss. 4, p. 174B, ProQuest ID 32495098.*

"Rockwell Automation and PSDI form strategic alliance", Jan. 21, 2000, pp. 1, www.nasatech.com/NEWS/Jan00/ntb.rckwl0121.html.*

Dilger, Karen Abramic, "Portable Maintenance", Dec. 1997, Manufacturing Systems, vol. 15, Iss. 12, p. 20, ProQuest ID 23622757.*

Crane, Todd; Eilenberg, Jeff; "Locomotive 6724, where are you? Integration of GPS, Mobile Telemetry, and GIS technologies in a railroad environment", 1997, Proceedings from the 1997 Users Conference, Paper 584, pp. 1-9, gis.esri.com/library/userconf/proc97.*

Barbito, Karin; Rogosky, Donna; "Remote visual inspection—an eye for steam generator maintenance", Jan. 1999, Nuclear Engineering International, Dartford, vol. 44, Iss. 534, p. 21, ProQuest ID 39010996.*

King, Julia, "Maintenance Software gets Hot New Image", Jan. 15, 1996, Computerworld, vol. 30, Iss. 3, p. 52, ProQuest ID 9124135.*

Mediate, Joseph, "Using wireless communications to automate plant maintenance", Sep. 1997, Plant Engineering, vol. 51, Iss. 10, p. 143, ProQuest ID 16039040.*

Kuebler, George, "Mill Maintenance for the New Millenium", Apr. 1999, Metal Producing; 33, 4: Career and Technical Education, p. 34.*

BusinessWire, "Computer Associates Announces UniFleet, Automotive Industry's Most Advanced Fleet Management Solution", Mar. 1, 1999, New York, p. 1, ProQuest ID 39343047.*

Barron, Jim, "Troubleshooting for the Pro", Apr. 1998, Trailer Boats, vol. 27, Iss. 4, p. 22, ProQuest ID 28371440.*

Franklin, Scott, "CMMS selection: Building a solid foundation", Jun. 1999, Maintenance Solutions, vol. 7, Iss. 6, p. 20, ProQuest ID 43613137.*

Smith, Gary; Schroeder, JB; Masquelier, Barbara L; "Logistics for the Joint Strike Fighter—it ain't business as usual", Spring 1999, Air Force Journal of Logistics, Gunther AFS, vol. 23, Iss. 1, p. 13, ProQuest ID 56366195.*

Pepper, Jeff; "The age of intelligent machines: an expert system for Automotive Diagnosis", Excerpt from Ray Kurzweil's revolutionary book "The Age of Intelligent machines" published in 1990, www.kurzweilai.net/articles/art0310.html?printable=1.*

Moore, N.A.; Perakis, A.N.; "Development of a diesel engine reliability database (DEREL) for the US Coast Guard", Summer 1999, Marine Technology and SNAME News, vol. 36, Iss. 3, p. 127, pp. 1-21, ProQuest ID 46542236.*

Tortello, Enzo; Bleakley, Graham; "Moving from planned to predictive maintenance", Aug. 1998, Modern Power Systems, vol. 18, Iss. 8, p. 55, ProQuest ID 35275604.*

Rivero, Ramon R; "Using the Web to improve sustainment logistics", Mar./Apr. 1998, Army Logistician, vol. 30, Iss. 2, p. 27, ProQuest ID 29198916.*

Singer, Tom; "Breaking with Tradition: Tap into the Internet to maximize your CMMS", Mar. 1998, Plant Engineering, vol. 52, Iss. 3, p. 44, ProQuest ID 28669101.*

Trunk, Christopher, "The nuts and bolts of CMMS", Sep. 1997, Material Handling Engineering, vol. 52, Iss. 9, p. 47, ProQuest ID 13955401.*

Karl, Steven V; Lewis, Matthew W; "Redesigning PMCS", Jul./Aug. 1997, Army Logistician, p. 16, ProQuest ID 13119940.*

Luxhoj, James T; Williams, Trefor P; Shyur, Huan-Jyh; "Comparison of regression and neural network models for prediction of inspection profiles for aging aircraft", Feb. 1997, IIE Transactions, vol. 29, Iss. 2, p. 91, ProQuest ID 11314260.*

Prickett, Paul; "A Petri-net based machine tool maintenance management system", 1997, Industrial Management + Data Systems, vol. 97, Iss 4, p. 143, ProQuest ID 117542192.*

Kathawala, Yunus; Allen, William R; Motwani, Jaipeep; "Expert Systems: Applications in Quality", 1993, The International Journal of Quality & Reliability, vol. 10, Iss. 7, p. 32, ProQuest ID 1123102.*

Andel, Tom, "Maintenance Management tools stop dollar drain", Sep. 1996, Transportation and Distribution, vol. 37, Iss. 9, p. 63, Proquest ID 10341882.*

Watt, Lewis C.; "New maintenance technologies: Sustaining a 21st century Marine Corps", Jan. 1999, Marine Corps Gazette, vol. 83, Iss. 1, p. 36, ProQuest ID 38038719.*

* cited by examiner

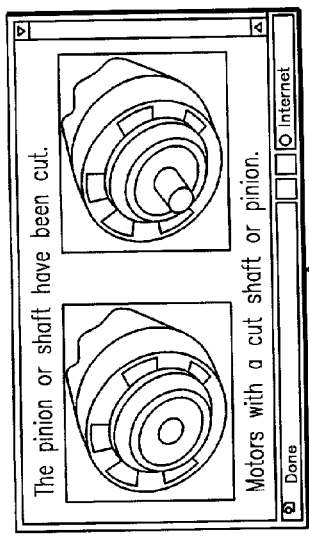
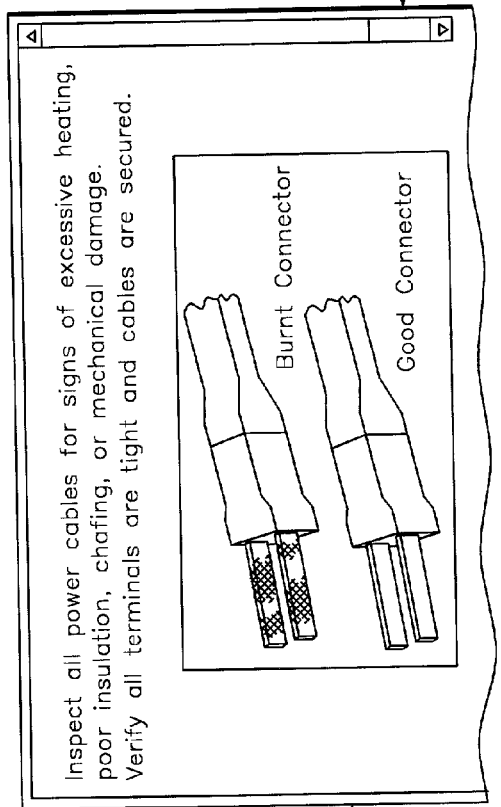
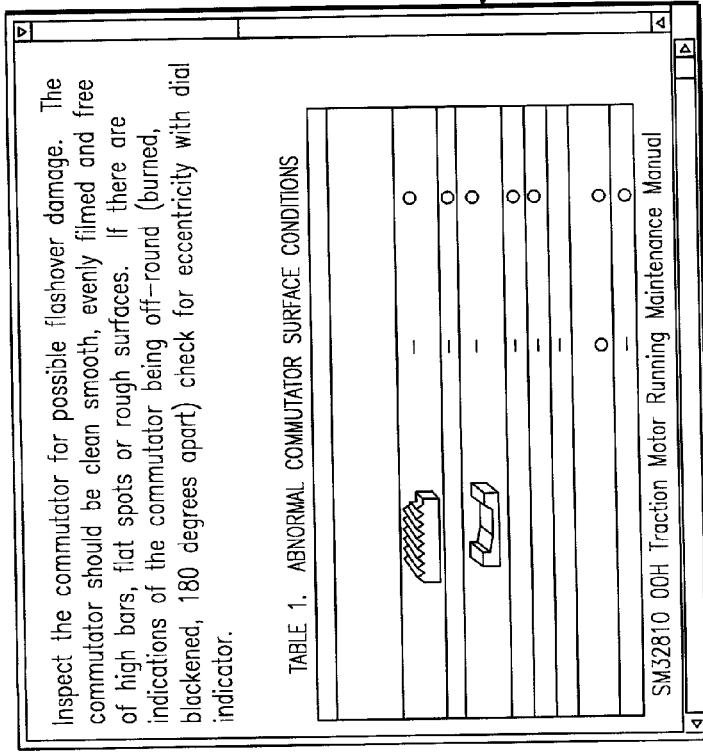
FIG. 4A | FIG. 4B
FIG. 4
FIG. 4A

COMPUTERIZED METHOD AND SYSTEM FOR GUIDING SERVICE PERSONNEL TO SELECT A PREFERRED WORK SITE FOR SERVICING TRANSPORTATION EQUIPMENT

This application claims the benefit of U.S. patent application Ser. No. 60/223,148 filed on Aug. 7, 2000.

BACKGROUND OF THE INVENTION

The present invention relates generally to method and system for servicing generally complex equipment, and, more particularly, to computer-based method and system for guiding service personnel select a preferred work site for servicing selected equipment.

The management of a large fleet of mobile assets, such as a fleet of transit vehicles, railway locomotives, on-road vehicles, off-road vehicles, etc., is a challenging logistics effort. There is continuing pressure for the owners of such assets to improve the efficiency of operations of the assets to remain competitive in the market place. For example, railroads must manage their fleets of locomotives to maximize the on-train time and to minimize the occurrence of unexpected failures in order to remain competitive with alternative modes of transportation. The assignee of the present invention is a supplier of locomotive engines and other generally complex equipment and has developed numerous design features and services to maximize the efficiency of operation of its locomotives and equipment. The assignee of the present invention has also undertaken to provide integrated maintenance services to the owners of such equipment. Such services include coordinating operation of a plurality of repair and maintenance work sites, including sites, e.g., operated by different customers, suppliers, or both, having their own unique capabilities, in order to timely and reliably supply necessary parts and labor for performing equipment repair.

It is believed that known prior art servicing practices suffer of undesirable and uncontrollable large variability due to the lack of systematic methodologies for conducting troubleshooting operations at the work sites, such as the various service sites of a given customer. That variability becomes even greater when sites of different customers, suppliers, or both, are involved. Such prior art servicing practices may result in costly and time consuming inefficiencies being that equipment, e.g., system components or assemblies used in the locomotive, may be unnecessarily referred for servicing due to unverifiable symptoms or may fail to be referred for servicing when true indications of incipient faults are not recognized by the user.

Further, unnecessary servicing expenses may be accumulated when components are sent to work sites without tracking historical data of diagnostics and corrective actions previously conducted on a given component. Additionally, components that need a specific repair action should not be routed to work sites that lack the ability to perform such repair action. For example, a given work site may have the personnel and tools needed to perform one type of corrective action but not other types of corrective actions. Similarly, even if the work site has the personnel and tools to conduct a given type of servicing operations, such work site may be temporarily unavailable due to scheduling constraints, or force majeure events that may temporarily shut down a given site. It would be further desirable to be able to quickly and systematically guide the personnel servicing the equipment to determine at least one preferred work site location for performing the services based on technical and business-decision criteria that may lead to a more cost-effective and timely delivery of the services.

The coordination of the servicing of a large fleet of locomotives and the communication with the various parties involved in such efforts is a monumental task. Thus, there is a particular need for an effective and efficient method for managing diagnostic an repair data in a plurality of work sites that service a large fleet of mobile assets.

BRIEF SUMMARY OF THE INVENTION

Generally, the present invention fulfills the foregoing needs by providing in one aspect thereof a computerized method for guiding personnel servicing equipment requiring repair while at an equipment work site. The personnel is guided through a plurality of tasks for evaluating the health of the equipment to identify the nature and extent of service needed, and determining at least one preferred work site location for performing the services based on technical and business decision-making criteria.

The method allows for providing a database accessible from the equipment work site. The database comprises detailed data for health assessment and servicing of selected equipment. The database further comprises technical and business decision-making data regarding the service capabilities and availability, and costs of transportation to and servicing of equipment at available work sites for servicing the selected equipment.

The method further allows for configuring a servicing wizard for eliciting information regarding the identity and characteristics of the equipment to be repaired, providing instructions to the service personnel to determine the nature of the equipment fault and the servicing required for the equipment, and determining based on the technical and business decision-making criteria each preferred work site.

An input/output device is provided at each work site for communicating with the database.

The personnel selects the equipment to be serviced, and access the database to interface with the servicing wizard for the selected equipment. The method allows for providing in response to a first set of prompts to the personnel from the servicing wizard at least one set of observations selected from the group comprising operational performance of the selected equipment and fault indications detected in the equipment. In response to a second set of prompts, at least one set of technical and business decision-making criteria is provided, which includes the cost and timeliness for performing services that may be required for the selected equipment.

The observation information, and technical and business decision-making criteria are processed relative to the servicing wizard to determine whether or not the selected equipment needs to be serviced, and if so the nature and extent of that service. The processing further allows for determining a preferred work site from among the available work sites at which to perform the service in accordance with the technical and business decision-making criteria.

The present invention further fulfills the foregoing needs by providing in another aspect thereof, a computerized system for guiding personnel servicing equipment requiring repair while at an equipment work site. The personnel is guided through a plurality of tasks for evaluating the health of the equipment to identify the nature and extent of service needed, and determining at least one preferred work site location for performing the services based on technical and business decision-making criteria.

The system includes a database accessible from the equipment work site. The database comprises detailed data for health assessment and servicing of selected equipment. The database further comprises technical and business decision-making data regarding the service capabilities and availability, and costs of transportation to and servicing of equipment at available work sites for servicing the selected equipment.

A servicing wizard is used for eliciting information regarding the identity and characteristics of the equipment to be repaired, providing instructions to the service personnel to determine the nature of the equipment fault and the servicing required for the equipment, and determining based on the technical and business decision-making criteria each preferred work site.

An input/output device is used at each work site for communicating with the database and selecting the equipment to be serviced. A database management module is used for accessing the database to interface with the servicing wizard for the selected equipment and provide in response to a first set of prompts to the personnel from the servicing wizard at least one set of observations selected from the group comprising operational performance of the selected equipment and fault indications detected in the equipment. In response to a second set of prompts, at least one set of technical and business decision-making criteria is provided, including the cost and timeliness for performing services that may be required for the selected equipment. A processor is configured to process the observation information, and the technical and business decision-making criteria relative to the servicing wizard to determine whether or not the selected equipment needs to be serviced, and if so the nature and extent of that service. This processing further determines a preferred work site from among the available work sites at which to perform the service in accordance with the technical and business decision-making criteria.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
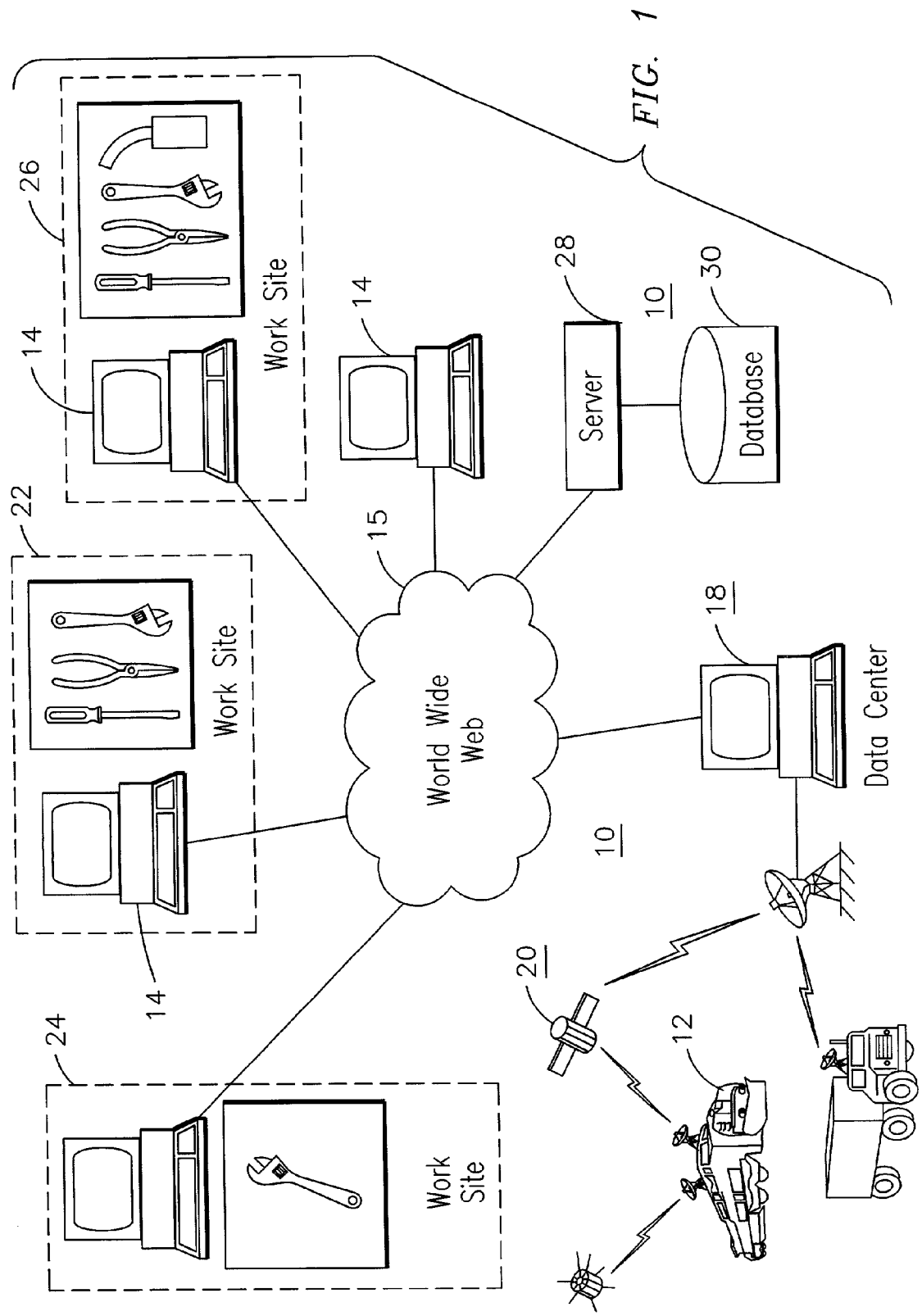
FIG. 1 is a pictorial rendering of an exemplary system that may be used for practicing aspects of the present invention.

It will be appreciated that an important element in the effective management of a fleet of mobile assets is the ability to communicate information regarding the operability of each of the assets in a timely and effective manner. As shown in FIG. 1, a communications system 10 for a fleet of mobile assets, such as a plurality of locomotives, trucks, airplanes, marine vessels, etc., allows a respective user to obtain detailed and timely information regarding the operating status of each of the mobile assets 12 through a computer terminal 14 equipped with a web browser. It will be appreciated that the type of computer terminal may take different forms, such as a desk computer, laptop computer, hand-held computer, etc. Further, the type of communication link may take different forms, such as a telephone line link, cable modem, wireless link, etc. In the exemplary embodiment of FIG. 1, the mobile assets 12 may be a fleet of locomotives owned and operated by a respective business entity, such as a transportation company. It will be appreciated that, although the description that follows is provided in the context of a fleet of locomotives and equipment used by the locomotives, the present invention is applicable to any system, mobile or stationary, made up of generally complex equipment that may require servicing and repair at a preferred work site, based on technical and/or business decision-making considerations, such as cost and timeliness for performing the service, location of the equipment relative to the work site, availability of the site, technical capability of the site, etc. The locomotives, such as provided by the assignee of the present invention, may be equipped with a plurality of sensors for monitoring a plurality of operating parameters representative of the condition of equipment onboard the locomotive 12 and of the efficiency of its operation. The locomotive 12 may also be equipped with a global positioning system (GPS) receiver 16 or other satellite based or local instrument for determining the geographic location of the locomotive 12. Data regarding the location of the locomotive 12 and its operating parameters may be transferred to a data center 18, such as by a satellite system 20. The assignee of the present invention operates such a data center 18 at its Monitoring and Diagnostics Service Center (MDSC) in Erie, Pa. Affiliated with such a data center 18 may be a plurality of service or work sites, e.g., work sites 22, 24 and 26, where the locomotives 12 or selected equipment are taken for repair and maintenance services.

Figure 2:
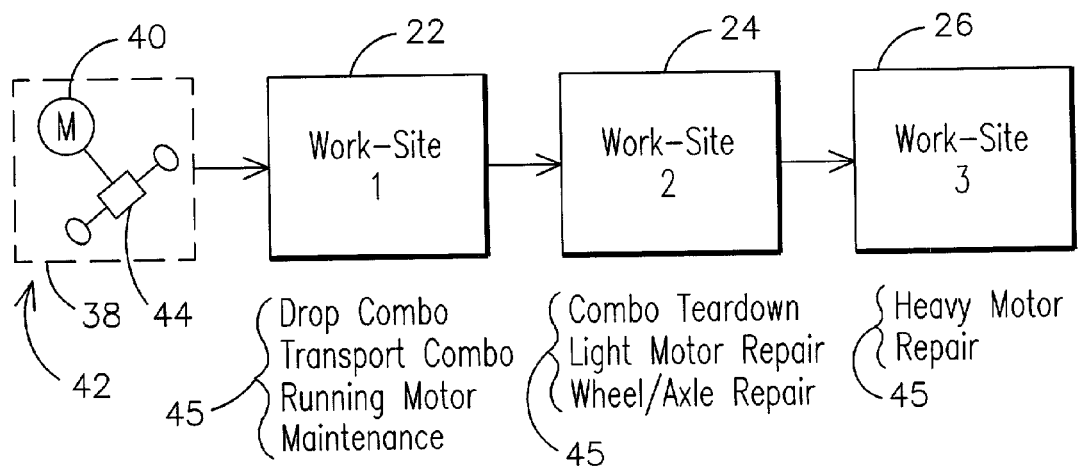
FIG. 2 illustrates a schematic view of three exemplary work sites and respective technical capabilities associated with each of such sites.
Figure 3:
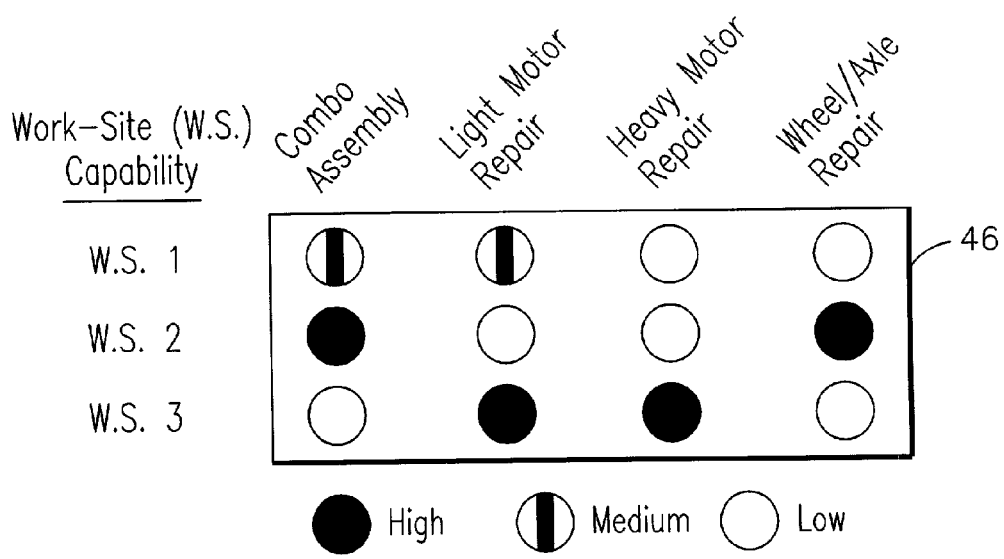

As illustrated in more detail in FIGS. 2 and 3, each of such work sites may have a respective technical capability 45 for servicing selected equipment of the fleet of mobile assets. Assuming an exemplary selected equipment (e.g., system or subsystem) 38 comprising in combination a traction motor 40, a wheel axle set 42 and a gear assembly 44, a first work site, e.g., work site 22, may have the capability for performing some basic troubleshooting operations in connection with the foregoing combination of components, transporting the combination to another work site, such as work site 24 or 26 having more specialized personnel and/or servicing tools, and for conducting straight forward motor maintenance.

Thus, as illustrated in the first row of a matrix 46 shown in FIG. 3, the first work site may be rated to having medium capabilities for conducting assembly operations relative to system 38 and for conducting relatively minor motor repairs. Conversely, such first work site may be rated to have relatively low capabilities for conducting major motor repairs or wheel-axle repair. As illustrated in the second row of matrix 46, the second work site may be rated to have relatively high capabilities for conducting wheel-axle repair and assembly operations while being rated with low capabilities for conducting any type of motor repair. As illustrated in the third row of matrix 46, the third work site, such as may operated by the assignee of the present invention, may be rated to have relatively high capabilities for conducting minor and major motor repairs while having relatively low capabilities for conducting assembly operations and wheel-axle repairs.

As illustrated in FIG. 1, data center 18 and the plurality of work sites may comprise a chain of networked sites, including sites managed by independent business entities, linked to one another by way of the Internet 15 or an intranet, by computer connections to a server 28 coupled to a database 30 containing data configurable to enable a respective user to conduct standardized troubleshooting operations and to populate the database with historical data of diagnostics and/or corrective actions conducted for each respective component. Thus, the Internet and World Wide Web provide exemplary means for communicating between each of work sites 22, 24 and 26. As suggested above, these facilities may also be in communication with other facilities of the transportation company via the Internet connection. Because the Internet 15 presently provides cost-effective means for communicating data and information in a multimedia format, it is one useful vehicle for displaying and communicating the large amount of data that may be associated with the operation of a fleet of mobile assets 12.

Figure 4B:
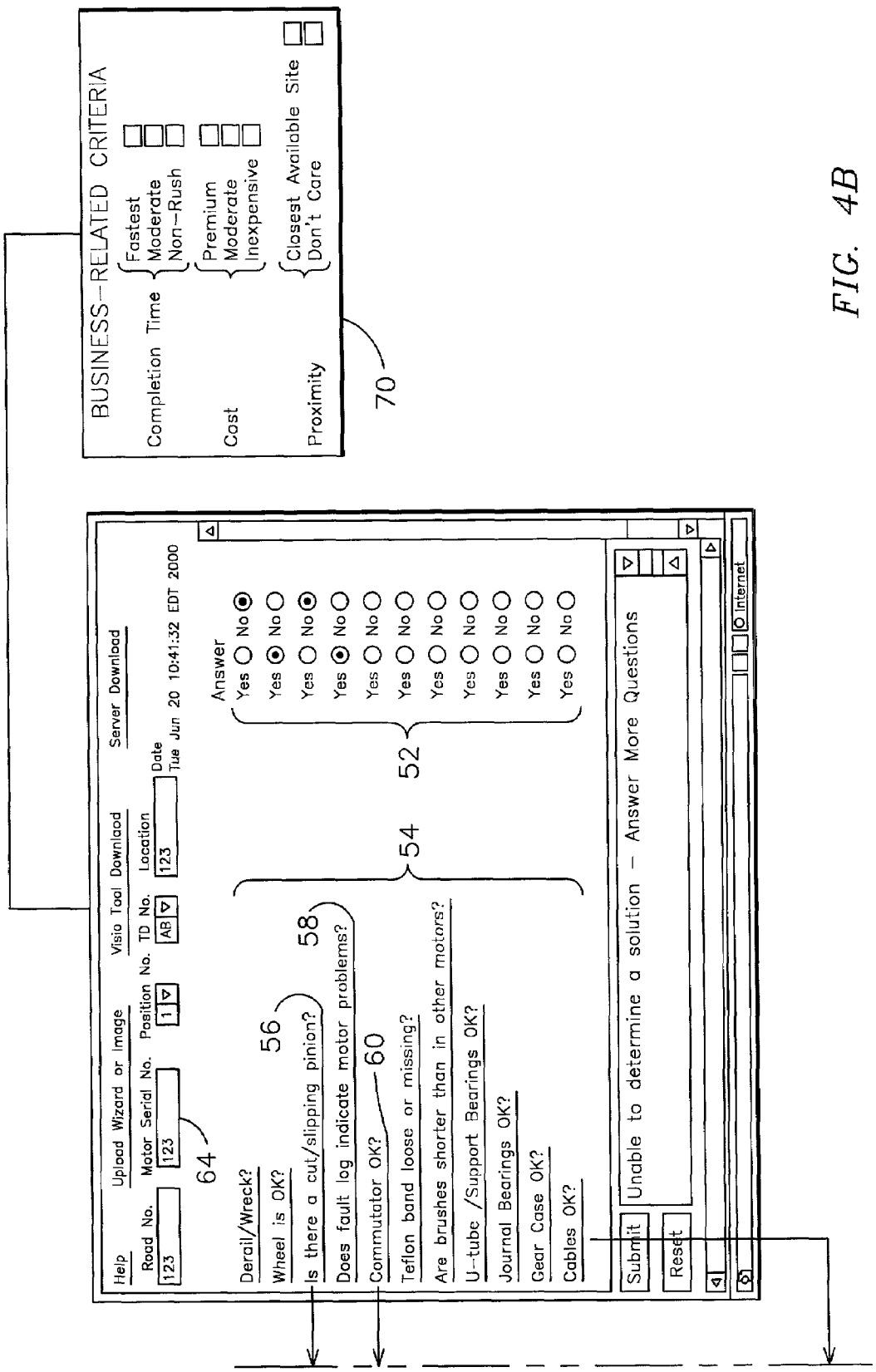
FIG. 4 illustrates an exemplary web-page containing respective hyperlinks for accessing a set of instructions for conducting a troubleshooting operation relative to respective components of respective equipment used by a respective mobile asset.

For example, as shown in FIG. 4, a set of troubleshooting instructions 50 may be generated at server 28 for conducting a troubleshooting operation for determining whether any selected equipment, such as exemplary system 38, of the mobile asset is defective. Server 28 may be further configured to generate a respective corrective action based on various criteria, such as observation data 52 submitted by the user to server 28 in response to a first set of prompts 54 presented to the user relative to the troubleshooting operation. Respective troubleshooting instructions may be provided to the user by selecting through a computer interface device, such as a mouse, a respective hyperlink, e.g., hyperlinks 56, 58 and 60, coupled to database 30 to download the appropriate troubleshooting instructions for the selected equipment. For example, hyperlink 56 may allow the user to download respective images representative of wheel axle sets with a cut pinion or with an uncut pinion, or both. Hyperlink 58 may allow the user to download text and a table useful for determining abnormal commutator surface conditions whereas hyperlink 60 may allow the user to download images and instructions for determining the presence of defective and non-defective electrical connectors. Based on the answer data and other criteria set forth below, server 30 may generate a respective corrective action relative to the troubleshooting operation.

Figures 5, 6:
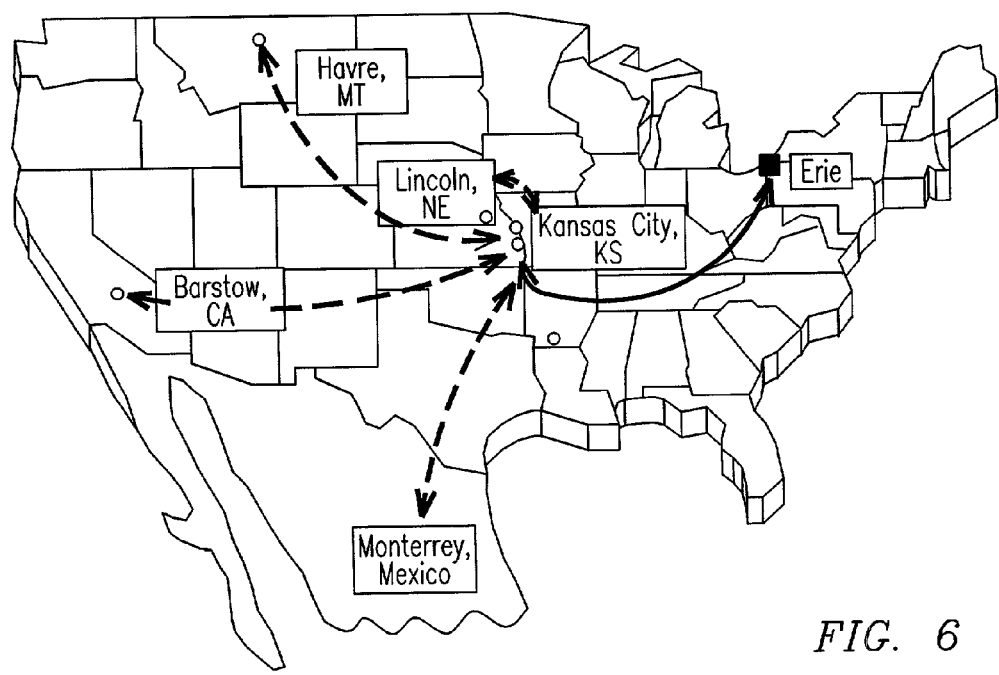
FIG. 5 illustrates an exemplary web-page containing observation data relative to a troubleshooting operation for a wheel axle set, which observation data may be processed to determine appropriate corrective action in the event of defects in the wheel axle set.
FIG. 6 illustrates an exemplary chain of networked work sites as may be distributed over a relatively large geographical area in North America.

As shown in FIG. 4, there may be instances where the user will be referred to conduct additional troubleshooting operations in order to generate a suitable corrective action. For example, as shown in FIG. 5, in order to determine the presence of defects in a respective wheel axle set, additional observation data 62 may have to be submitted by the user in order for the server to generate an appropriate corrective action.

In one aspect of the present invention, the corrective action may comprise assigning a respective repair action and may further comprise determining a preferred work site at which the assigned repair action may be executed. For example, if the corrective action comprises conducting a relatively major traction motor repair, then server 28 will automatically instruct the user so that traction motor 40 is routed via any suitable mode of transportation to work site 26, which is specifically rated to conduct such type of motor repairs. Conversely, if the corrective action comprises conducting a relatively minor motor repair, then such repair action could be conducted either at work site 22 or work site 26, depending on additional criteria, such as geographical proximity of the work site relative to the present location of the component, personnel availability, scheduling constraints, inventory of parts to be replaced, etc. In another aspect of the invention, the service personnel provides in response to a second set of prompts 70 (FIG. 4) at least one set of technical and business decision-making criteria, such as the cost and timeliness for performing services that may be required for the selected equipment. For example, in order to determine the preferred work site for performing the repair, the user may be prompted to indicate whether the completion time of the repair should be as fast as possible, moderate or non-rush; or whether the budget available for performing the repairs would permit paying premium, moderate or inexpensive charges; or whether or not the proximity of the work site relative to the equipment to be repaired is important.

In another aspect of the present invention, a computer-readable tracking identifier 64 (FIG. 5) may be provided so that database 30 may be populated with historical diagnostic and/or corrective action for each equipment having undergone the troubleshooting operation. For example, if the traction motor is routed from work site 22 to work site 26, then personnel at work site 26 may quickly search database 30 using the tracking identifier to learn the troubleshooting operations previously conducted on that traction motor, and thus avoiding duplication of unnecessary operations. Further, once that traction motor is redeployed in the field, then further updates to the historical data will allow for verifying whether the repair action was effective or ineffective. For example, a subsequent defect in that traction motor may be attributed to a new defect or such subsequent defect may be attributed to a repeat defect. Thus, collection of such type of historical data for the fleet of mobile assets would allow data center 18 to execute diagnostic and repair analysis to statistically and probabilistically adjust any existing troubleshooting operations and/or corrective actions so as to improve the rate of detection and correction of defects at the respective work sites. The tracking identifier may be affixed onto the equipment itself and may be of a form suitable for standard bar code scanning technology.

It will be appreciated that server 28 and database 30 may be configured to manage respective web pages containing performance reports, operating statistics, and/or current location map for the fleet of mobile assets. One or more such web pages may be utilized with appropriate hyperlinks to additional web pages. By nesting related web pages, the level of detail presented to the user may be controlled by that user. For example, a location map illustrating the current geographic location of each of the locomotives 12 owned by a transportation company may include a hyperlink at the indication of the location of each of the locomotives 12. The hyperlink could provide a link to an additional web page displaying specific information related to the operating parameters of that particular locomotive 12. One user, such as a customer of the transportation company may only be interested in the location of the train. Another user, such as a service engineer employed by the railroad, may be interested not only in the location of the locomotive, but also whether the locomotive is likely to reach a respective work site before a road failure occurs. Both such users can quickly obtain the information they need by a simple point and click operation using an Internet browser.

An Internet web page display used with the present invention may incorporate the full power of the multimedia capabilities of the Internet 15. For example, a system status report may include the use of color to indicate a readiness status for each system component, for example, green for a properly functioning component, yellow for a component exhibiting an anomaly in one of its operating parameters, and red for a system component having a critical fault. The user of such information would be able to quickly assimilate a large volume of data and to have his/her attention directed to important portions of the data. Such an Internet web page may also include links to additional pages containing drawings of component parts, specifications, or operating and repair manuals or other design parameters. As suggested above, in some instances, it may be advantageous to include video information on such an Internet web page, such as still or motion pictures transmitted from the mobile asset to show the condition of a component. Such video information may be accompanied by live audio information, thereby allowing one or more users at respective work sites and personnel at a work site 22 to conference regarding a developing anomaly.

The information available to the user on the Internet web page may also include information regarding specific services that may be available at any given work site and/or a parts inventory that may be important to any decision regarding a corrective action recommendation. Personnel located at a respective work site may not only provide data for components referred to that site but may also receive a communication from other users regarding a planned maintenance activity, thereby facilitating the scheduling of maintenance activities at each work site.

The speed of communication via the Internet and the breath of information that may be effectively communicated via an Internet web page makes the communication system 10 of FIG. 1 particularly useful for managing diagnostics and repair data for the plurality of sites that provide services for a large fleet of mobile assets distributed over a large geographic area.

Access to an Internet web page containing important and/or sensitive information regarding a fleet of mobile assets may be restricted to only those users having appropriate authorization to access such data. For example, information derived from analysis of database 30 may be displayed on a password protected Internet web page. Only authorized users would then be provided with the password necessary to gain access to the web page. Similarly, information received from a user and used to update the database may only be accepted as authentic if the user enters an appropriate password to confirm his/her identity. Other protection measures such as data encryption may also be used.

FIG. 6 illustrates one example of a chain of networked work sites distributed over a relatively large geographical area in North America. In accordance with aspects of the invention, service personnel in Erie, Pa. may have at his or her finger tips the type of information that would be useful for selecting a preferred work site for performing the services based on technical and business decision-making criteria. For example, a particular customer may need a relatively light motor repair. Assuming in one example that the equipment is presently located in Kansas City, Kans.; that time is not of the essence, and that the customer has indicated their budget cannot afford premium charges, then one preferred work site for performing that repair may be for example, Monterrey, Mexico. In this case, the relatively inexpensive labor charges may be sufficient to offset the transportation charges to that remote site. If on the other hand, the repair requires use of specialized tooling available only in work sites, such as in respective sites in Havre, Mont. or in Lincoln, Nebr., then the preferred work site, assuming similar labor charges at both such sites, may be determined based on the proximity and/or availability of either of the work sites to perform the repair. In accordance with another aspect of the invention, it will be appreciated that the techniques of the present invention may be used for identifying servicing practices gathered from the chain of work sites, and evaluating the value of such practices based on the technical and business decision-making criteria.

Figure 7:
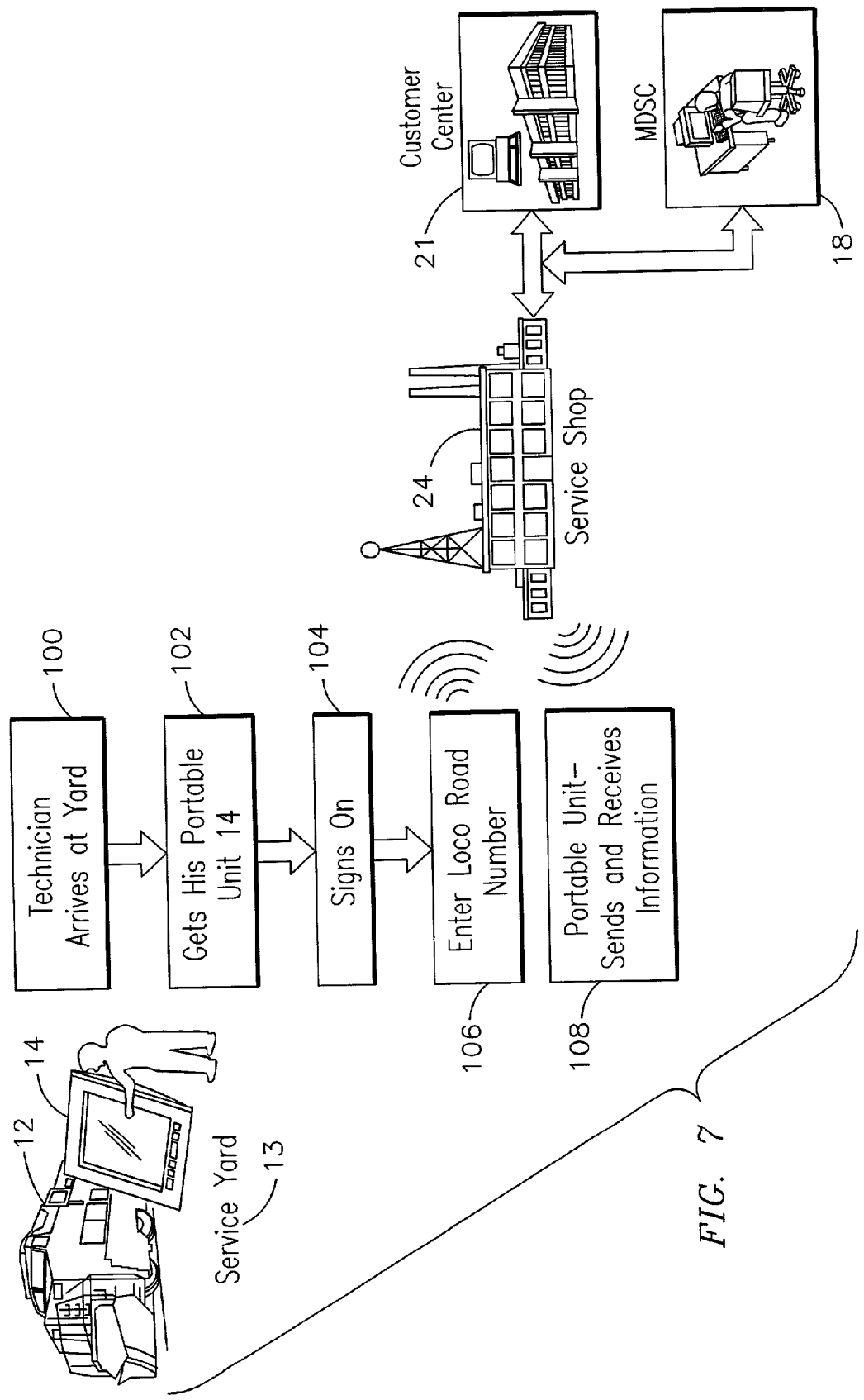
FIGS. 7 and 8 are respective flow charts illustrating an exemplary repair process for a given equipment.
Figure 8:
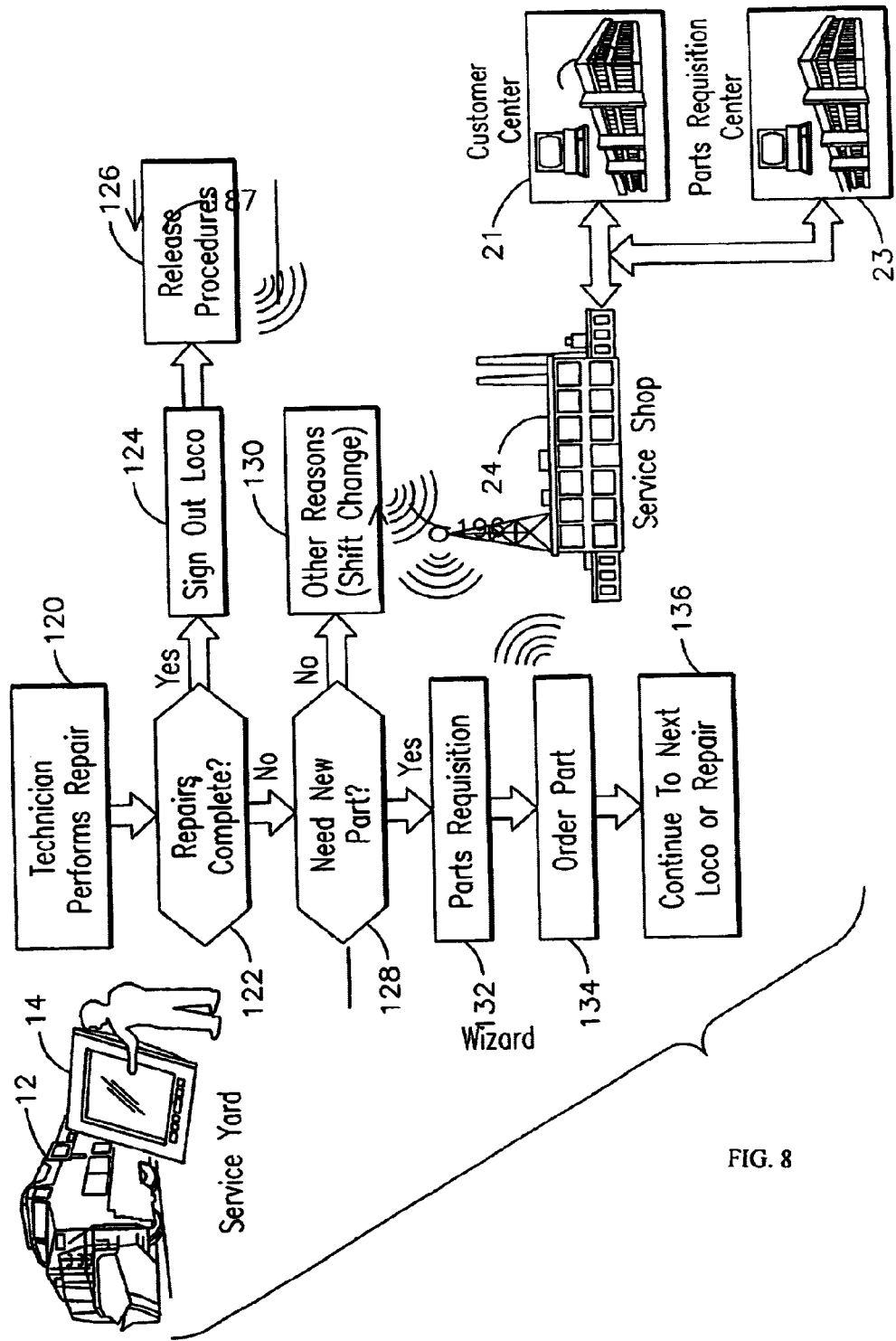

FIGS. 7 and 8 are flow charts showing exemplary steps that may be involved in implementing a service recommendation according to one aspect of the present invention. Typically, the service recommendation is a recommendation for a repair, but the teachings of the present invention are not so limited. Service recommendations can also involve maintenance procedures or diagnostic processes with the objective of finding the root cause for a fault or anomalous condition. At a step 100, a technician arrives at the service yard 13 where the locomotive is parked. For example, the technician retrieves a portable unit 14 (step 102) and signs on at a step 104. At a step 106, the technician enters the locomotive road number or other locomotive identification number, which is transmitted to the available work site, e.g., work site 24. FIG. 7 illustrates this transmission through a wireless arrangement, although as will be appreciated by those skilled in the art, there could also be a wire-based connection between the portable unit 14 and the work site 24. The work site 24 may then establish a communications connection with a customer center 21 and/or the MDSC 18. The portable unit 14 queries the MDSC 18 for information for the locomotive road number entered at step 106. The technician may request information, such as repair or maintenance information, historical repairs, etc. Once the requested information is received at the work site 24, it is sent to the portable unit 14, as illustrated at a step 108.

Information sent from the portable unit 14 to the MDSC 18 includes faults in a locomotive, the current status of locomotive systems, repair requests, diagnostic information and video clips and still photographs. Locomotive faults may be observed directly by the technician or downloaded from the locomotive on-board monitoring system as previously discussed. Information returned to the portable unit 14 from the customer center 21 and the MDSC 18 includes recommended repairs and relevant technical documentation required to perform the repairs. This information is displayed on the portable unit 14 to allow the technician to accurately and quickly repair the locomotive. The information displayed on the portable unit 14 includes a pictorial view of the locomotive and its constituent parts, repair steps, technical documentation relevant to the repair, and the tools necessary to perform the repair. Assembly diagrams and assembly instructions are also displayed. Multimedia information, such as video clips or audio instructions can also be transmitted to the portable unit 14 from the MDSC 18. In short, a vast amount of servicing information is immediately available to assist the technician with diagnosis, repairing and/or servicing of the locomotive.

Continuing to FIG. 8, a step 120 represents the technician's execution of the repair or service task. A decision step 122 asks whether the repair has been completed. When completed, processing continues to a step 124 where the locomotive is signed out from the repair site, either the service yard 13 or the work site 24. At a step 126, release procedures are executed, after which the locomotive is returned to service. The release procedures involve confirming that all necessary steps required for return to service have been completed and generating a notice to railroad operational personnel that the locomotive 12 is ready to return to service.

If the repair has not been completed at the decision step 122, processing continues to a decision step 128, where inquiry is made as to whether a new part is needed to complete the repair. If a new part is not required, processing continues to a step 130 to determine why the repair has not been completed. For example, there may have been a work-force shift change during the repair process. In any case, the reasons why the repair has not been completed are communicated to the work site 24 by the technician via the portable unit 14.

If a new part is needed, processing moves from the decision step 128 to a parts requisition step 132, where, the portable unit 14 communicates with the work site 24 to requisition the part. A step 134 is executed for those parts that must be ordered from a third party supplier, via the parts requisition center 23. As illustrated by step 136, once the part has been ordered, the technician can continue the diagnostic and repair process for another locomotive or perform another repair on the current locomotive.

The electronic data delivery system of the present invention provides in one aspect thereof an improvement in the diagnosis, repair and maintenance of a mobile asset such as the locomotive 12 by applying E-business technologies to replace the prior manual paper-based processes. A benefit derived from applying these technologies includes improved availability of the mobile asset by reducing the cycle time of the repairs and more efficient and focused repair processes. Additionally, the many processes related to a repair operation will be measurably improved in accordance with the teaching of the present invention.

Figure 9:
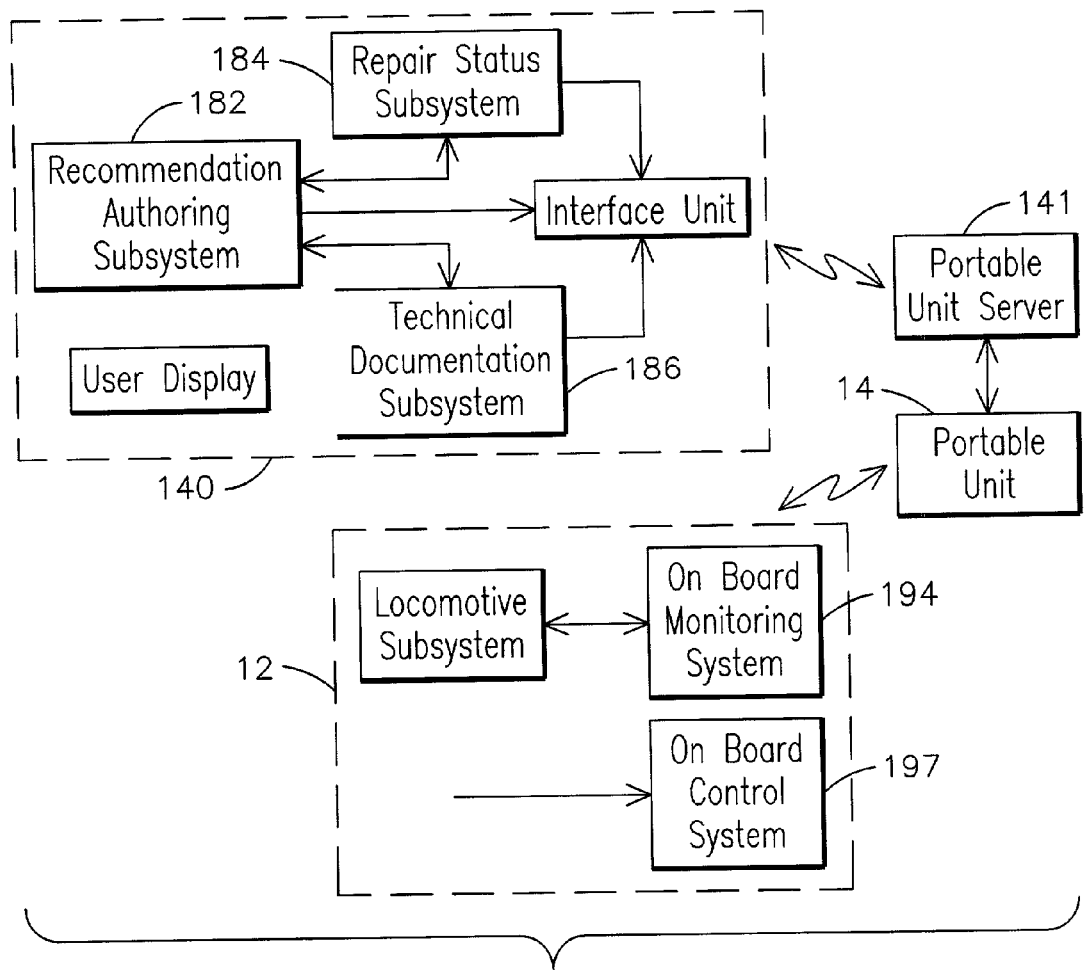
FIG. 9 is a block diagram representation of exemplary components of a system for practicing aspects of the invention.

A diagnosis and repair system 140, a portable unit server 141, and the portable unit 14, constructed according to aspects of the present invention are illustrated in FIG. 9. FIG. 9 depicts aspects of the present invention from the system/subsystem level. The diagnosis and repair system 140 includes a recommendation authoring system 182, a repair status system 184, a technical documentation system 186, and an interface unit 40. In one exemplary embodiment, the recommendation authoring subsystem 182 includes an expert repository and an operational parameter database. The repair status subsystem 184 includes a locomotive history database, a maintenance planning and scheduling database, a repair information vault, and an inspection information database. As suggested above, the diagnosis and repair system 140 may communicate with the portable unit 14 via the portable unit server 141. The communication link between the portable unit server 141 and the interface unit 140 can be either wired or wireless. Likewise, the portable unit 14 communicates (using either a wired or wireless media) with various components aboard the locomotive 12. In particular, the portable unit 14 extracts data from and provides data to an on-board monitoring system 194. Also, the portable unit 14 can query other locomotive subsystems, shown generally by a reference character 196.

The recommendation authoring subsystem 182 provides the functionality for authoring general repair recommendations and instantiating specific recommendations for a locomotive. The recommendation authoring system 182 provides the following exemplary functions: defining the steps involved in a repair, specifying the relevant technical documentation to accompany the repair recommendation and specifying the data that needs to be collected by the technician to execute the repair. The repair recommendation, instructions, and data to be collected are compiled into a cohesive deliverable package that is eventually delivered to the portable unit 14. In one embodiment, the compiled information is provided as a web formatted package. By using a web format (or other standardized format) the information can be displayed on the portable unit 14 in a standard format with which the technician will eventually become familiar. Consistency and familiarity with the repair information format allows the technician to efficiently navigate through the information provided and in this way increase his productivity. One feature of the recommendation authoring subsystem 182 is the creation of repair-specific process steps (including all relevant technical documentation necessary to execute each step) for the technician. Using all the general diagnosis, repair and technical information available, the recommendation authoring subsystem 182 selects only that information needed for a specific repair as associated with a specific locomotive based on a unique locomotive designator, such as the road number, and presents this to the technician. With repair-specific information and back-up technical documentation readily available, the technician can more easily and efficiently execute the repair process.

The repair status subsystem 184 maintains and provides information on the status of a repair. This information is based on feedback provided by the technician during and after completion of the repair. The technical documentation subsystem 186 maintains the technical documentation for the locomotives and supports the selection and retrieval of the appropriate technical documentation into a repair-specific set of relevant technical documentation.

The portable unit server 141 disseminates repair instructions to the portable units 14 and collects information from those units. Although only one portable unit 14 is shown in FIG. 9, it will be understood that the portable unit server 141 can communicate with many portable units 14. It is expected that each technician or team of technicians with service or repair responsibility will have a portable unit 14. The functionality provided by the portable unit server 141 includes: serving as a communications link to the interface unit 40, connecting with and identifying each portable unit 14 at power up, transferring feedback files from the portable unit 14 to the diagnosis and repair system 140, transferring the repair recommendations and relevant technical documentation to the portable unit 14, synchronizing clock times, validating the identity of the technician using the portable unit 14 and clearing files from the portable unit 14 once these files have been transferred to the portable unit server 141. In one embodiment of the present invention, the portable unit 14 can communicate directly with the diagnosis and repair system 140, thus rendering the portable unit server 141 unnecessary. In such an embodiment, the tasks performed by the portable unit server 141 are performed by the diagnosis and repair system 140 and/or by the portable unit 14.

The portable unit 14 displays the repair instructions to the repair technician and creates a record of the service event. Among the functions of the portable unit 14 are: providing a log in and log out interface, displaying repair instructions and all supporting technical documentation (including multimedia information), accepting repair feedback information and updating the repair feedback file when a repair action is finished and communicating with the locomotive 12 to extract information from the on-board monitoring system 194 and the other locomotive subsystems 196.

In one exemplary embodiment, a principal function of the recommendation authoring subsystem 182 is to select general repair recommendations from the various sources available within the diagnosis and repair system 140 and to transform this information into a set of locomotive-specific, repair-specific instructions and relevant documentation. The recommendation and authoring subsystem 182, in one embodiment, is located at the monitoring and diagnostic service center 20. A general repair recommendation is those repair actions (i.e., a sequence of steps to be performed by the technician to execute the repair) that are responsive to a given set of fault codes. These fault codes are downloaded by the portable unit 14 from the on-board monitoring system 194 and the other locomotive subsystems 196, and provided to the recommendation authoring subsystem 182. The fault codes may also be communicated directly and automatically to the MDSC 18 from the on-board monitor. In the present invention, the general repair recommendations are instantiated into a specific repair recommendation for a given fault that has occurred on a specific (i.e., road number) locomotive 12. A user display 187 is responsive to the recommendation authoring subsystem 182 for use by the repair expert 142 in formulating the repair recommendation.

The technical documentation available to the recommendation and authoring subsystem 182 includes parts catalogs, maintenance manuals, schematic diagrams, fault code listings, and back shop manuals, and various multimedia files, such as video or audio instructional materials. This information represents typically recommended documents needed for a repair. Specific pages and excerpts from this generalized documentation are identified by the recommendation authoring subsystem 182 when the recommendation is instantiated for a particular locomotive repair.

In one exemplary embodiment, the recommendation authoring system 182 interfaces with the technical documentation subsystem 186 to locate technical documentation and multimedia presentations relevant to the recommendation. The recommendation authoring system 182 provides search criteria to the technical documentation subsystem 186 for retrieving relevant documentation. Included within the search criteria are one or more of the following: part name, part number, action name, repair fault code, and locomotive model. Search scope information is also provided to the technical documentation subsystem 186 for specifying where to look for relevant documentation. Included within the search scope are parts catalogs, maintenance manuals, schematics, back shop manuals, fault analysis pages, field modification instructions, and multimedia files. In response to the inputs, the technical documentation subsystem 186 responds to the recommendation authoring system 182 with the location of the technical documentation that satisfies the search criteria. The output is a list and each entry in the list contains the following information about that entry: location of the page (for subsequent retrieval), size of the file making up the page, the type of page (i.e., the document source), and the locomotive road number or numbers to which the page applies.

Another interface between the recommendation authoring subsystem 182 and the technical documentation subsystem 186 provides access to a browsing mechanism within the technical documentation subsystem 186. This browsing mechanism allows the repair expert to review the documentation pages to determine if it is necessary to refine the search criteria.

As illustrated in FIG. 9, the recommendation authoring subsystem 182 also interfaces with the repair status subsystem 184. The recommendation authoring subsystem 182 allows selection of existing general repair recommendations for a specific problem or repair code. Also, the recommendation authoring subsystem 182 inputs a summary of the repair recommendation to the repair status subsystem 184 so that the latter can create an entry in the repair status database for each repair. The repair status subsystem 184 responds to the recommendation authoring subsystem 182 when the repair entry is created. The transmitted summary includes: the repair case number, the date and time that the recommendation was issued, the road number to which it applies, the steps outlined in the repair recommendation, the technical documentation to accompany each repair step, and the repair status. The recommendation authoring subsystem 182 also provides to the repair status subsystem 184 the data store locations for the data entry objects. The purpose of this input is to ensure that the data store locations are recognizable by the repair status subsystem 184.

The repair status subsystem 184 also supplies a list of possible locations for storing the values collected by the data entry objects. The repair status subsystem 184 stores these values when they are received following an actual repair event, as part of the repair feedback process.

The technical documentation subsystem 186 maintains the technical documentation repository and supports the selection and retrieval of technical documentation into a repair specific set of relevant documents by the repair expert. In one embodiment, the technical documentation is available in a web-based format. The technical documentation subsystem 186 supports the retrieval of individual pages or sections from technical documents, rather than retrieval of the entire document. The technical documentation is also indexed. These indexes provide quick identification of document subsets. For example, the indices can support identification of all documentation pages related to a specific part number, a specific part name, or a repair process name. All relevant technical documents are stored in the technical documentation subsystem 186. The stored documents are: parts catalogs, wiring and parts schematics, maintenance manuals, fault analysis pages, back shop manuals, field modifications instructions, training instructions, part identification animations, assembly animations, etc. The documentation includes both text, graphics, and visualization based documents. Thumbnail style summaries may be included with each document.

The files of the technical documentation subsystem 186 can be remotely browsed. That is, a user logged in to a network computer connected to the diagnosis and repair system 140, but not necessarily the equipment hosting the technical documentation subsystem 186, can search for pages, view pages, follow links between pages, and copy pages to a local file.

The technical documentation subsystem 186 supports a search mechanism based on one or more of the following criteria: part name, part number, action name, fault code, locomotive model, and document type. Search results are presented in the form of a summation of the search results, with pointers to the actual pages so they can be retrieved on demand. The technical documentation subsystem 186 also supports the retrieval of individual document pages or document sections from its files. The retrieval process copies the retrieved pages to the user's application. The retrieval mechanism automatically adjusts hyperlinks between the copied pages accordingly.

The technical documentation subsystem 186 receives two types of inputs from the recommendation authoring system 182. These include search criteria and search scope. Search criteria refer to one or more of the following: part name, part number, action name, fault code, or locomotive model number. The search scope refers to parts catalogs, maintenance manuals, schematics, back shop manuals, fault analysis pages, and field modification instructions.

The output from the technical documentation subsystem 186 is the list of all the technical documentation pages satisfying the search criteria. Each entry contains the following: the location of the page (for subsequent retrieval), the size of the file that makes up the page, the type of page (that is, the document source), and the locomotive road numbers to which the page applies. The recommendation authoring subsystem 182 can also access the technical documentation subsystem 186 for generalized browsing of the files. This feature allows a user to browse the documentation pages to determine the appropriate search criteria to use.

In one exemplary embodiment, the portable unit server 141 may use the following data concepts: specific recommendation directories, user identity files, portable unit status databases and home page files.

The recommendation directory is the location of web-deliverable, linked packages of repair instructions and technical documentation (including multimedia files) provided by the diagnosis and repair system 140 for each repair recommendation. This information is transferred to the portable unit server 141 and filed there. Each recommendation directory has a standard file format and architecture that allows the portable unit server 141 to read summary information about the repair recommendation.

Each repair home page begins with a summary of the repair steps and their corresponding feedback or data entry objects. From these original repair actions, the technician can drill down to more detailed information about the repair steps via links. In one embodiment, there is always a one-click path back to the original repair action from the deeper links. Once the repair step has been completed and appropriate feedback information obtained and recorded, the next step in the repair process is displayed, with links again to supporting documentation.

The user identity file, used by the portable unit server 141 as a data concept, contains names of all technicians registered to use the portable units 14. When a technician logs on, the identity entered in the log in box is checked against the identities stored in the portable unit server 141. If the identification is not in the file, the technician is asked to re-enter the identification information. The portable unit server 141 also includes a portable unit status database containing information about the deployment of each portable unit 14.

In one exemplary embodiment, each repair recommendation may have a structure that includes the following data: the recommendation identification number, the recommendation status, the technician identification number, the portable unit identification number, the log in time when the repair began, and the log out time when the repair was finished. Each repair recommendation has a file containing this information.

The last data element used by the portable unit server 141 is the home page list of recommendations. The home page list is the initial file displayed on the portable unit 14 when a technician logs on. The home page file includes a list of the currently active recommendations with: the locomotive road number, the repair technician identification number, the repair status, and a short description of the repair. A technician selects a specific recommendation from the home page file for transfer to his portable unit 14, at which time the specific recommendation directory is transferred to the portable unit 14. Whenever any data related to an active repair recommendation is changed, the home page file is automatically modified to reflect the change.

The repair status subsystem 184 (see FIG. 9) maintains and provides information on the status of each repair. Instantiating a repair recommendation triggers the creation of an entry in the locomotive history database of the repair status subsystem 184. The locomotive history database is updated with data values collected by the data entry objects during a repair operation. Each repair entry in the locomotive history database supports the following data items: repair case number, railroad case number, locomotive road number, the date the recommendation was issued, the rail yard where the repair was performed, and a list of the rail yard personnel who worked on the recommendation. Each repair entry also includes the data values collected with each step, the date the repair step was performed (as derived from the data collection process), and the current repair status (e.g., none, active, halted, or complete).

A new repair status entry is created in the repair records database of the repair status subsystem 184 as follows. When a new recommendation is instantiated in the recommendation authoring subsystem, a summary is passed to the repair status subsystem 184. This action triggers the creation of an entry in the repair records database for the recommended repair. If a recommendation for a given case number is instantiated multiple times, the repair status subsystem 184 maintains the latest version of the recommendation. The repair status subsystem 184 maintains the most recent feedback irrespective of the version of the recommendation.

As discussed above, there is a considerable amount of technical documentation available to the technician using the portable unit 14. The technician can navigate or search through the technical documentation by using wizard applications or visual drill downs. Additionally, the technical documentation includes on-line tutors that can be used to enhance the technician's understanding of the structure and function of the locomotive. The tutors are available in various levels of difficulty.

Figure 10A:
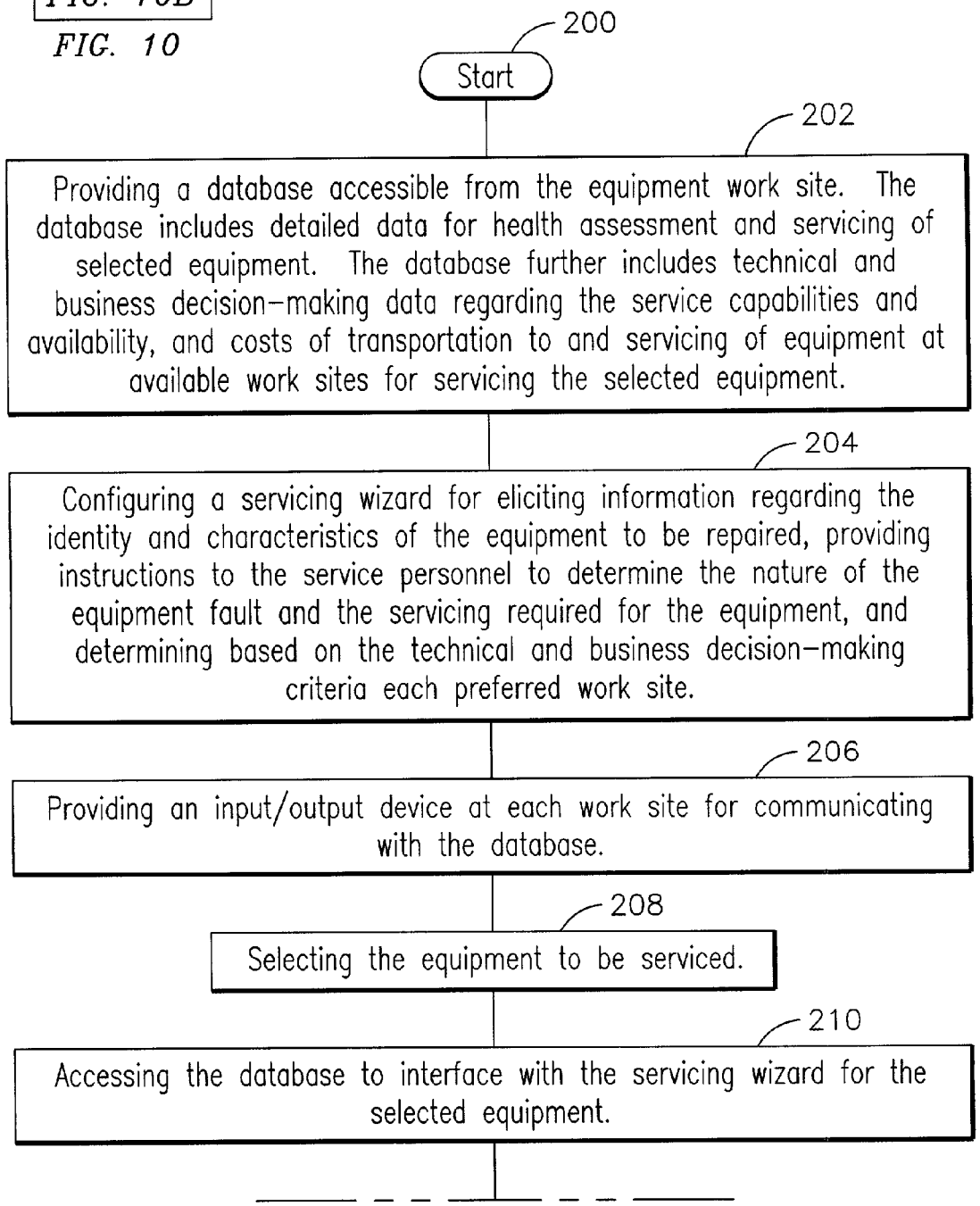
FIG. 10 is a flow chart of a computerized method for guiding personnel servicing equipment that may need a repair in accordance with aspects of the invention.
Figure 10B:
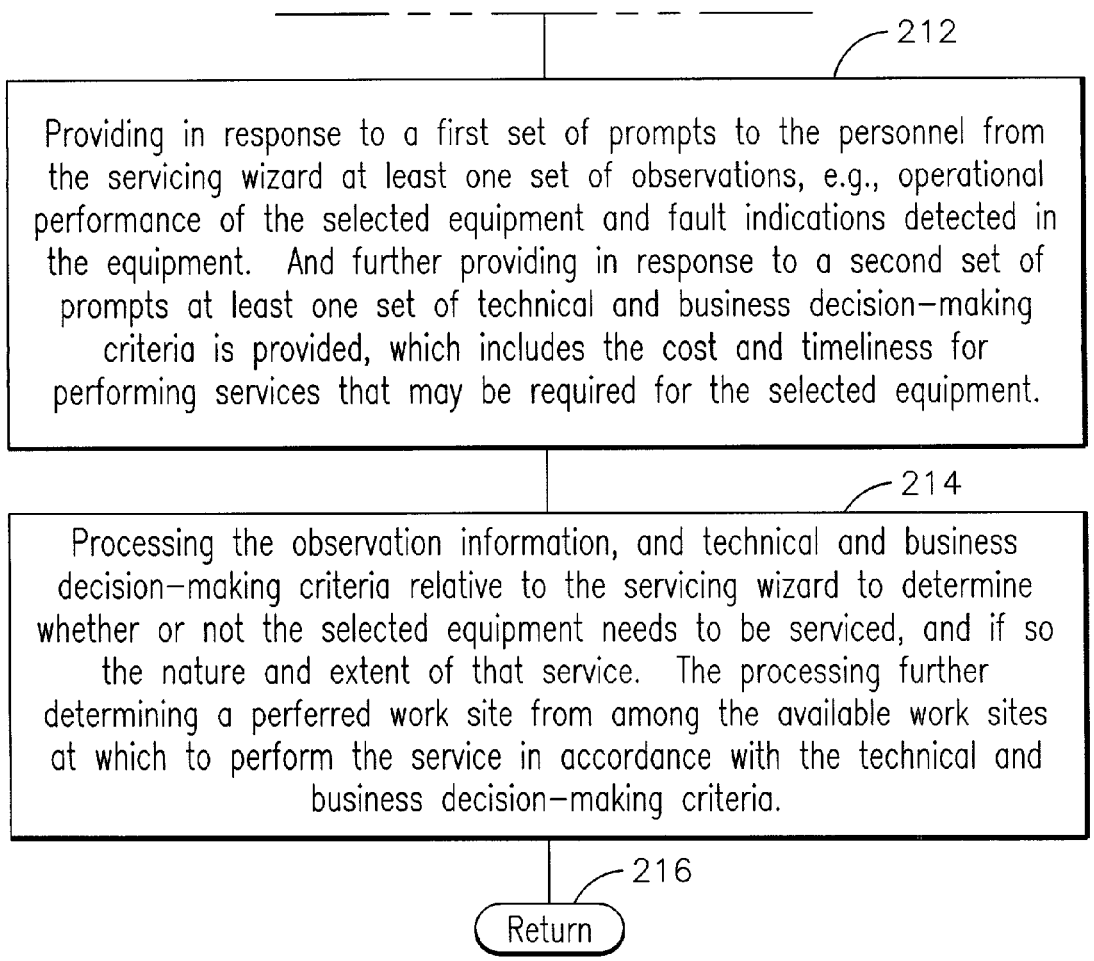

FIG. 10 shows a flow chart of a computerized method for guiding personnel servicing equipment requiring repair while at an equipment work site. The personnel is guided while at an equipment site through a plurality of tasks for evaluating the health of the equipment to identify the nature and extent of service needed. The method allows for determining at least one preferred work site location for performing the services based on technical and business decision-making criteria. Subsequent to start step 200, step 202 allows to provide a database accessible from the equipment work site. The database includes detailed data for health assessment and servicing of selected equipment. The database further includes technical and business decision-making data regarding the service capabilities and availability, and costs of transportation to and servicing of equipment at available work sites for servicing the selected equipment. Step 204 allows to configure a servicing wizard for eliciting information regarding the identity and characteristics of the equipment to be repaired, providing instructions to the service personnel to determine the nature of the equipment fault and the servicing required for the equipment, and determining based on the technical and business decision-making criteria each preferred work site. At step 206, an input/output device is provided at each work site for communicating with the database. At step 208, the equipment to be serviced is selected. At step 210, the database is accessed to interface with the servicing wizard for the selected equipment. At step 212, the method allows for providing in response to a first set of prompts to the personnel from the servicing wizard at least one set of observations selected from the group comprising operational performance of the selected equipment and fault indications detected in the equipment. And further provides in response to a second set of prompts at least one set of technical and business decision-making criteria, which includes, for example, the cost and timeliness for performing services that may be required for the selected equipment. Prior to return step 216, the method processes, step 214, the observation information, technical and business decision-making criteria relative to the servicing wizard to determine whether or not the selected equipment needs to be serviced, and if so the nature and extent of that service. The processing further determines a preferred work site from among the available work sites at which to perform the service in accordance with the technical and business decision-making criteria.

Figure 11:
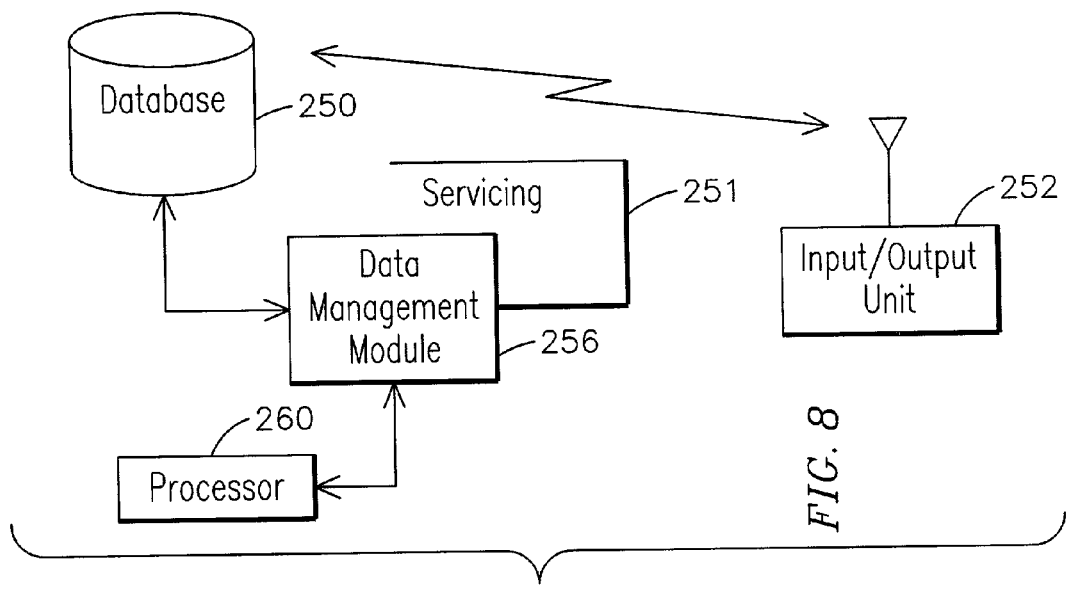
FIG. 11 is a block diagram representation of an exemplary system for performing the flow chart of FIG. 10.

FIG. 11 illustrates elements used in a computerized system for guiding personnel servicing equipment requiring repair while at an equipment work site through a plurality of tasks for evaluating the health of the equipment to identify the nature and extent of service needed for such a system. The system allows for determining at least one preferred work site location for performing the services based on technical and business decision-making criteria. A database 250 is provided which comprises detailed data for health assessment and servicing of the selected equipment. The database also includes technical and business decision-making data regarding the service capability and availability, and cost of transportation to and servicing of equipment at available work sites for servicing the selected equipment. A servicing wizard 251 is configured for eliciting information regarding the identity and characteristics of the equipment to be repaired; providing instructions to determine the nature of the equipment fault and the servicing required for the selected equipment; and determining based on the technical and business decision-making criteria each preferred work site. An input/output device 252 is located at each work site for communicating with the database and selecting the equipment to be serviced. A data management module 256 is provided for accessing the database to interface with the servicing wizard for the selected equipment. The data management module 256 provides, in response to a first set of prompts to the personnel from the servicing wizard, at least one set of observations selected from the group comprising operational performance of the selected equipment, and fault indications detected in the equipment. Module 256 further provides in response to a second set of prompts, at least one set of technical and business decision-making criteria, which includes, for example, the cost and timeliness for performing services that may be required for the selected equipment. The system also includes a processor 260 configured to process the observation information technical and business decision-making criteria, relative to the servicing wizard 251 to determine whether or not the selected equipment needs to be serviced, and if so the nature and extent of that service. The processor further determines a preferred work site from the available worksites at which to perform the service in accordance with the technical and business decision-making criteria. As suggested above, the database 250 may be updated from time-to-time to include any preferred servicing practices gathered from the work sites to share uniformly high quality services across the work sites.

Figure 12:
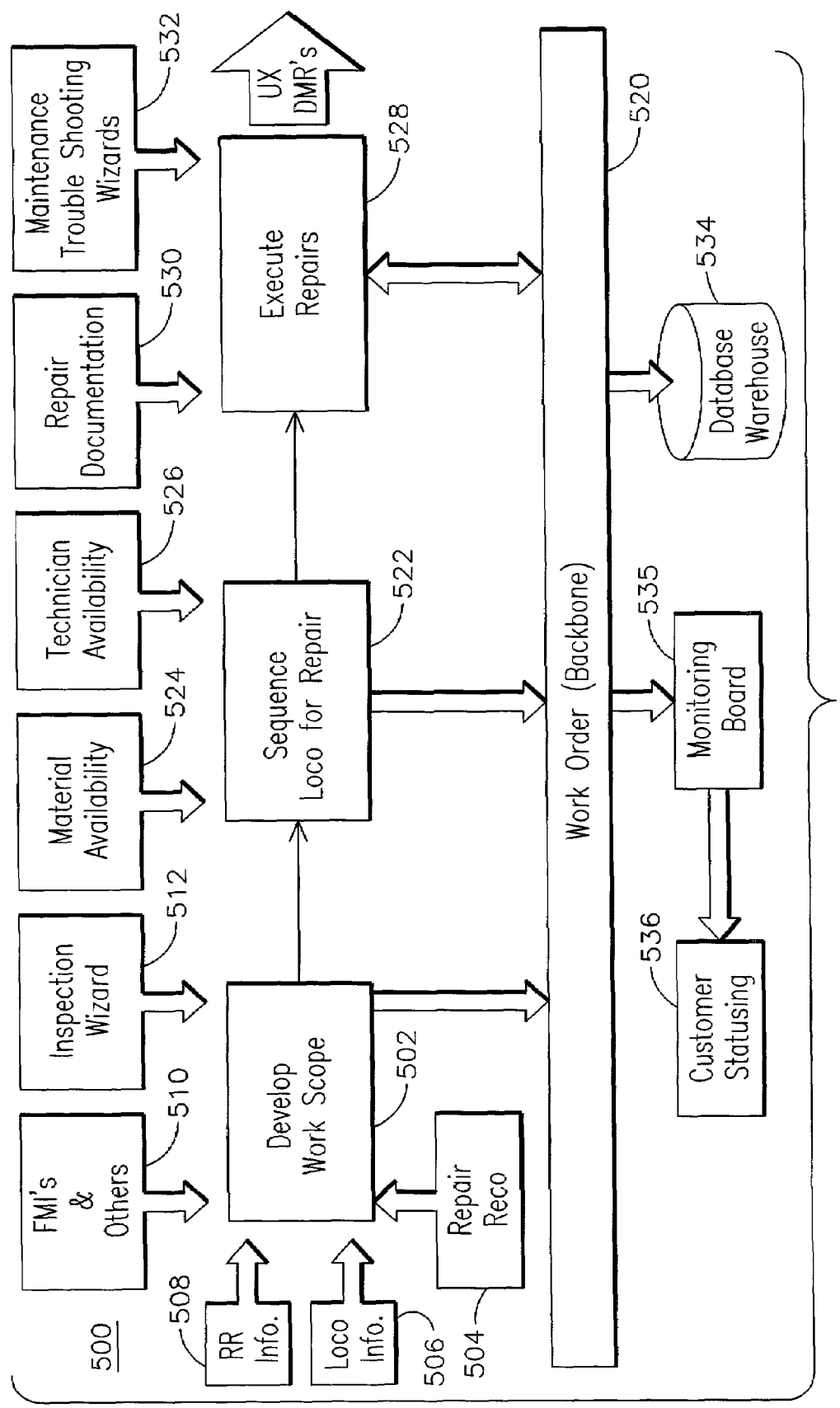
FIG. 12 is an exemplary work flow chart showing operational details for implementing a repair and/or service recommendation.

FIG. 12 illustrates an exemplary work-flow module 500 embodying aspects of the present invention to control various processes associated with implementing a repair or service recommendation. The first step of the work order module 500 is the development of a work scope at a step 502. The development of the work scope is influenced by certain tasks and processes input to a work order. For example, a repair recommendation 504, locomotive specific information 506, railroad specific information 508, field modification instructions and other recommendations requiring implementation 510 and an inspection wizard 512, the use of which may identify and add additional items to the work scope 502. The work scope information is input to a work order backbone 520 for creating a work order to implement the various tasks associated with the work scope 502. In preparing the work order, the cycle time associated with each task must be considered. Additionally, consideration must be given to sequencing available locomotives for repair. This information is also input to the work order backbone 520 from a step 522. Factors that influence the repair schedule include material availability as indicated by a step 524 and the availability of other required resources, such as the availability of technicians to implement the repairs as indicated by the reference character 526.

Following the sequencing step 522, the work order is activated and execution of the repair initiated as indicated by a step 528. The technician is directed during the execution of the repair through the portable unit 14 as discussed above. The information displayed on the portable unit 14 directs the step-by-step activities of the technician through the repair process including providing documentation and information from the various databases and modules discussed in conjunction with FIG. 2. With regard to FIG. 8, this information is indicated by a reference character 530. The technician also utilizes maintenance troubleshooting wizards, identified by a reference character 532 during the repair process. Also as discussed above, data entry objects (feedback) are provided by the technician as the repair progresses. This information is shown as symbolically supplied to the work order backbone 520 and from there stored in a data warehouse 534. Real time repair status information is provided from the work order backbone 520 to a monitoring board 535, which may be located in the service shop 16 or at the service yard 13 for providing information on the status of the various in-process repairs. Further, information as to the repair processes can be supplied directly to a customer either in written form or transmitted electronically for display at a customer site, as shown by a reference character 536. Additionally, the status information generated by the work order backbone 520 can be reviewed and used to improve the reliability of the various locomotive subsystems and further used to improve repair processes across all the service shops and service yards operated by the railroad. Communication of this status information across the railroad network can be efficiently accomplished via satellite communications, a land-based system or through a cellular telephone network.

The present invention can be embodied in the form of computer-implemented processes and apparatus for practicing those processes. The present invention can also be embodied in the form of computer program code containing computer-readable instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose computer, the computer program code segments configure the computer to create specific logic circuits or processing modules.

While the invention has been described in what is presently considered to be one exemplary embodiment, many variations and modifications will become apparent to those skilled in the art. Accordingly, it is intended that the invention not be limited to the specific illustrative embodiment but be interpreted within the full spirit and scope of the appended claims.

What is claimed is:

1. A computerized method for guiding personnel servicing selected locomotive equipment from a group of generally similar locomotive equipment, with said selected locomotive equipment being made up of a plurality of systems and subject to unique locomotive configurations and servicing requirements, said selected equipment requiring repair while at an equipment work site, with the personnel being guided through a plurality of tasks for evaluating the health of the equipment to identify the nature and extent of service needed, and determining at least one preferred work site location accesible through a railroad network for performing the services based on technical and business decision-making criteria, said method comprising:

providing a database accessible from the equipment work site, the database comprising detailed data for health assessment and servicing of selected locomotive equipment, the database further comprising technical and business decision-making data regarding the service capabilities and availability, and costs of transportation to and servicing of equipment at available work sites for servicing the selected equipment;

providing a respective locomotive equipment configuration identifier for uniquely identifying the selected locomotive equipment from among the group of generally similar equipment;

configuring a servicing wizard for eliciting information regarding the identity and characteristics of the equipment to be repaired, providing instructions to the service personnel to determine the nature of the equipment fault and the servicing required for the equipment, and determining based on the technical and business decision-making criteria each preferred work site;

providing a portable input/output device at each work site for communicating with the database from a location adjacent the selected equipment to be serviced via a wireless communication connection;

selecting the equipment to be serviced by communicating information indicative of the respective identifier for the selected equipment to the database through the portable input/output device;

accessing the database to interface with the servicing wizard for the selected equipment;

providing in response to a first set of prompts to the personnel from the servicing wizard at least one set of observations selected from the group comprising operational performance of the selected equipment and fault indications detected in the equipment, and further providing in response to a second set of prompts at least one set of technical and business decision-making criteria, including the cost and timeliness for performing services that may be required for the selected equipment and further providing a probabilistic estimation of whether a locomotive with the selected equipment can reach a respective work site before a road locomotive failure occurs as the locomotive travels on the railroad network; and processing said observation information, and said technical and business decision-making criteria relative to the servicing wizard to determine whether or not the selected equipment needs to be serviced, and if so the nature and extent of that service, said processing further determining a preferred work site from among the available work sites at which to perform the service in accordance with the technical and business decision-making criteria.

2. The computerized method of claim 1 wherein each work site is connected to one another as a networked chain of sites.

3. The computerized method of claim 2 wherein the chain of work sites includes work sites managed by independent business entities.

4. The computerized method of claim 2 further comprising identifying servicing practices gathered from the chain of work sites and evaluating the value of such practices based on the technical and business decision-making criteria.

5. The computerized method of claim 4 further comprising updating the database to include any preferred servicing practices gathered from the work sites to share uniformly high quality service practices across the work sites.

6. The computerized method of claim 1 further comprising accumulating in the database historical repair and/or service data, and including any diagnostics data for each respective equipment.

7. The computerized method of claim 6 further comprising assigning a computer-readable tracking identifier to each respective equipment so that service personnel may retrieve using the tracking identifier the historical data for any respective piece of equipment regardless of the location of the work site.

8. The computerized method of claim 6 further comprising performing analysis on the historical data so as to determine servicing trends as a function of any respective work site location.

9. A computerized system for guiding personnel servicing selected locomotive equipment from a group of generally similar locomotive equipment, with said selected locomotive equipment being made up of a plurality of systems and subject to unique locomotive configurations and servicing requirements, said selected equipment requiring repair while at an equipment work site, with the personnel being guided through a plurality of tasks for evaluating the health of the equipment to identify the nature and extent of service needed, and determining at least one preferred work site location accessible through a railroad network for performing the services based on technical and business decision-making criteria, said system comprising:

a database accessible from the equipment work site, the database comprising detailed data for health assessment and servicing of selected locomotive equipment, the database further comprising technical and business decision-making data regarding the service capabilities and availability, and costs of transportation to and servicing of equipment at available work sites for servicing the selected equipment;

a locomotive eguipment configuration identifier for uniquely identifying the selected locomotive equipment from among the group of generally similar equipment;

a servicing wizard for eliciting information regarding the identity and characteristics of the equipment to be repaired, providing instructions to the service personnel to determine the nature of the equipment fault and the servicing required for the equipment, and determining based on the technical and business decision-making criteria each preferred work site;

a portable input/output device at each work site for communicating with the database from a location adjacent the selected equipment to be serviced via a wireless communication connection and selecting the equipment to be serviced by communicating information indicative of the respective identifier for the selected equipment to the database;

a database management module for accessing the database to interface with the servicing wizard for the selected equipment and provide in response to a first set of prompts to the personnel from the servicing wizard at least one set of observations selected from the group comprising operational performance of the selected equipment and fault indications detected in the equipment, and further providing in response to a second set of prompts at least one set of technical and business decision-making criteria, including the cost and timeliness for performing services that may be required for the selected equipment and further providing a probabilistic estimation of whether a locomotive with the selected equipment can reach a respective work site before a road locomotive failure occurs as the locomotive travels on the railroad network; and a processor configured to process said observation information, and said technical and business decision-making criteria relative to the servicing wizard to determine whether or not the selected equipment needs to be serviced, and if so the nature and extent of that service, said processing further determining a preferred work site from among the available work sites at which to perform the service in accordance with the technical and business decision-making criteria.

10. The computerized system of claim 9 wherein each work site is connected to one another as a networked chain of sites.

11. The computerized system of claim 10 wherein the chain of work sites includes work sites managed by independent business entities.

12. The computerized system of claim 10 further comprising a processing module for identifying servicing practices gathered from the chain of work sites and evaluating the value of such practices based on the technical and business decision-making criteria.

13. The computerized system of claim 12 further comprising an updating module configured to update the database to include any preferred servicing practices gathered from the work sites to share uniformly high quality service practices across the work sites.

14. The computerized system of claim 9 further comprising a historical data accumulator for accumulating in the database historical repair and/or service data, and including any diagnostics data for each respective equipment.

15. The computerized system of claim 14 further comprising a computer-readable tracking identifier assigned to each respective equipment so that service personnel may retrieve using the tracking identifier the historical data for any respective piece of equipment regardless of the location of the work site.

16. The computerized system of claim 14 further comprising an analyzer module configured to perform analysis on the historical data so as to determine servicing trends as a function of any respective work site location.

* * * * *